Figure 1:
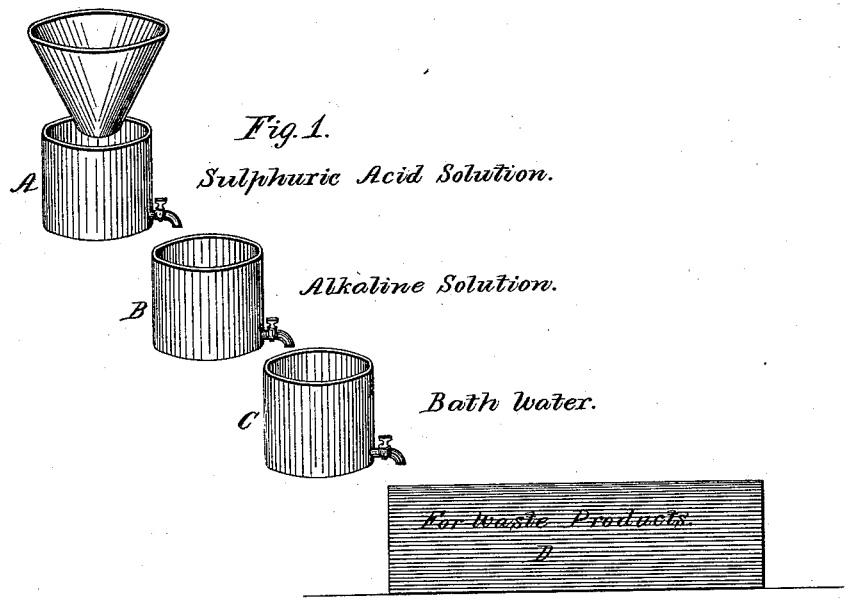

(No Model.) 2 Sheets—Sheet 1.

T. TAYLOR.
PROCESS OF TREATING COTTON SEED.

No. 297,193. Patented Apr. 22, 1884.

Sulphuric Acid Solution.

Alkaline Solution.

Bath Water.

For Waste Products.

Witnesses:

Inventor:
Thomas Taylor
by
Church & Church
his Attorneys.

(No Model.) T. TAYLOR. 2 Sheets—Sheet 2.

PROCESS OF TREATING COTTON SEED.

No. 297,193. Patented Apr. 22, 1884.

Witnesses:
W. C. Jirdinston
Fred F. Church

Inventor:
Thomas Taylor
by
Church & Church
Attorneys.

UNITED STATES PATENT OFFICE.

THOMAS TAYLOR, OF WASHINGTON, DISTRICT OF COLUMBIA, ASSIGNOR OF ONE-THIRD TO JAMES E. FITCH, OF SAME PLACE.

PROCESS OF TREATING COTTON-SEED.

SPECIFICATION forming part of Letters Patent No. 297,193, dated April 22, 1884.

Application filed November 26, 1883. (No model.)

*To all whom it may concern:*

Be it known that I, THOMAS TAYLOR, of the city of Washington, District of Columbia, have invented a certain new and Improved Process of Treating Cotton-Seed; and I do hereby declare the following to be a full, clear, and exact description of the same, reference being had to the accompanying drawings, forming part of this specification, and to the figures and letters of reference marked thereon.

The object of my present invention is to effect in a novel and economical manner the removal from the cotton-seed of the fiber which still adheres after the ginning operation without destroying said fiber and without injury to the hull of the seed or to the kernel within the hull.

To this end the invention consists in an improved mode of treating the seed, substantially as will be hereinafter fully described and claimed.

I have found upon experiment that if the cotton-seed in the condition which it is in when it comes from the gins is immersed in sulphuric acid of commerce the fiber on the seeds will be dissolved and quickly converted into charcoal. I have also found that a solution of one part of the sulphuric acid of commerce at 60° Baumé and one part of water by measure, used at the ordinary temperature of the atmosphere, will destroy the fiber and sometimes form it into a gelatinous mass and render it entirely useless. On the other hand, I have found that if the solution contains too much water the hull of the seed will become softened, and the acid and water together will be absorbed by the kernel and the latter rendered worthless. For instance, if cotton-seed is immersed in a solution of one measure of acid to ten of water for a period of three days it will become quite soft, so that it may be crushed between the fingers, while the cotton fiber is in no way loosened from the roots; but if the seed be immersed in a solution of sulphuric acid of one part by measure and water from two to six parts by measure, the fiber will be loosened from the root-cells, the cuticle of the seed partially disintegrated, the hull proper rendered impervious to water or acid, and the kernel kept perfectly dry, and this though the seed remain immersed in the solution for several days. The action of the acid solution when of the proportions last above given is to decompose the substance of the cells in which the fiber grows, to abstract water from the albumen of the hull proper, so as to consolidate its surface and render it impervious to the solution. As it is desirable to hasten the process of loosening the fiber, I preferably employ a solution in which one part of sulphuric acid, by measure, at about 60° Baumé is combined with from two to four parts of water.

In carrying out my invention I first preferably immerse the seeds in an acid solution of a strength within the limits hereinabove given and at about the temperature of the atmosphere, care being taken that the seeds be completely immersed, as otherwise the fiber will become injured. In from two to three days the fiber will be loosened and can be rubbed from the seed by the fingers; but as a next step I preferably wash the seed with a weak alkaline solution to neutralize the acid, which might otherwise corrode the fiber. After this I wash the seed with water to free the fiber from the salt formed by the combination of the acid with the alkali, and then place the seed on a floor or in a drying-room to dry under a moderate temperature. When dry, the seed is then subjected to the action of any suitable mechanical contrivance which will rub off the loosened fiber without injuring at all the hull proper. The removed fiber may then be used in the manufacture of paper or for other purposes, while the cleaned seeds may be either ground into meal or compressed for oil and oil-cake purposes, as desired.

In the process of treatment, the seeds after leaving the acid solution may be washed with water to save the acid, then with the alkaline solution, and then with water again, and then dried and finally divested of the fiber.

It is not essential that the seed be dried before being acted upon by the contrivance for rubbing off the fiber, as the latter operation may be performed as well while the seed and fiber are wet. As a matter of fact, the fiber when wet or damp is more readily detached from the seed than when dry.

Figure 3:
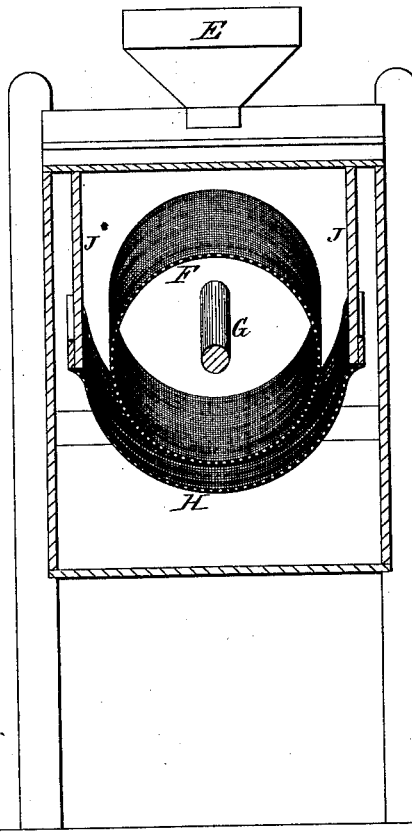
Figure 2:
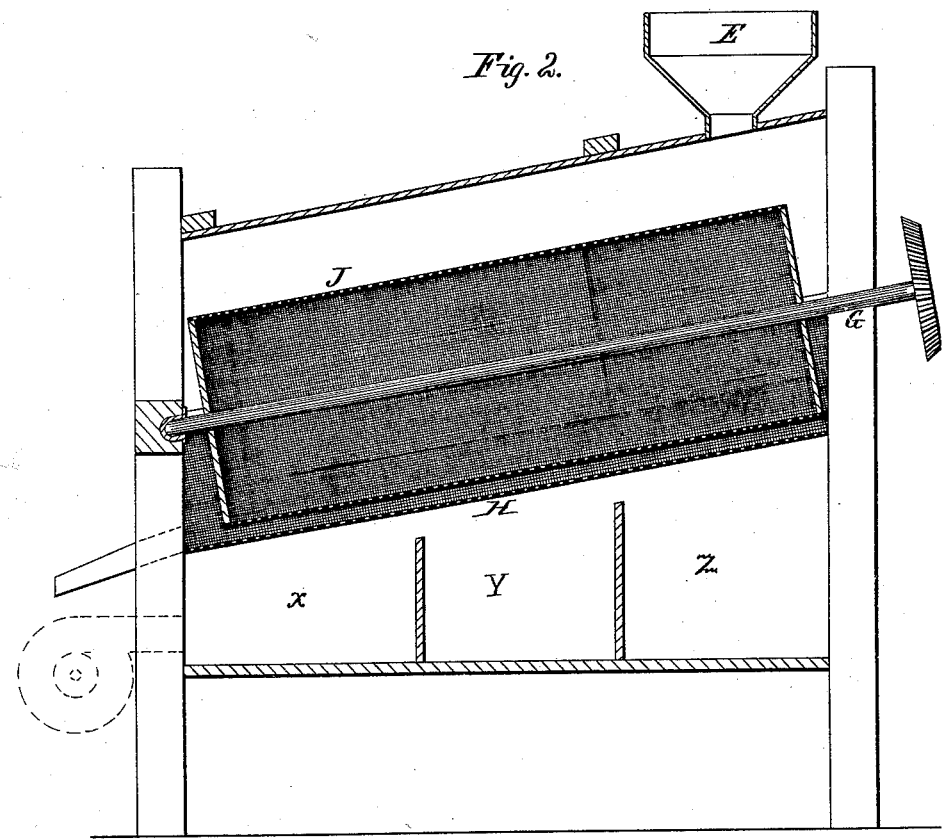

The accompanying drawings illustrate one form of apparatus which may be employed in carrying out the treatment, Figure 1 representing the means employed in treating the seed with the acid and other baths; and Figs. 2 and 3, a longitudinal sectional view and a cross-sectional view, respectively, of a machine for effecting the removal of the loosened fiber from the seed.

Similar letters of reference in the several figures denote the same parts.

A represents a lead-lined vat for containing the acid solution; B, a similar vat for containing the alkaline bath; C, a similar vat for containing the water bath, and D a receptacle for waste products.

The passage of the seeds through the preliminary stages of treatment, involving the use of the above instrumentalities, has been hereinbefore described.

In the fiber-removing machine represented in Figs. 2 and 3, E represents a hopper, into which the seed is fed after treatment with the acid solution; F, a wire-gauze cylinder supported upon and connected rigidly to a continuously-revolving inclined shaft, G; H, a half-cylinder or concave of wire-gauze so arranged with relation to the cylinder F as to leave a semi-annular space between the two for the passage of the seed; I, a discharge-spout, by means of which the cleaned seeds are conducted from the machine. The cylinder F and concave H are arranged within a casing, J, as shown. X Y Z are a series of compartments in which the fiber passed through the concave is collected.

When in operation, the previously-treated seeds are fed into the hopper E, from which they pass onto the cylinder F, and thence between the said cylinder and the concave H, where they are rubbed and abraded between the gauze surfaces until all the fiber is removed, the cleaned seeds tailing off through the discharge-spout I, while the fiber passes through the meshes of the concave and into the several compartments X Y Z, the cleanest grade of fiber being deposited in compartment X, and grades less clean in the succeeding compartments.

Any well-known means may be employed for inducing a suction through the machine; or, in lieu of a suction, a blast may be employed. A suction-fan is shown in dotted lines.

While the particular apparatus which I have herein shown and described is competent to carry out my improved process of treating cotton-seed, I do not desire to be understood as confining myself to the use of such apparatus alone, as it is susceptible of many modifications, and any equivalent of it will answer as well.

The cotton fiber removed from the seeds and saved by my improved process can be utilized to advantage in the manufacture of paper and for other purposes, while the cleaned seeds are less liable to deterioration from heat and dampness than the seeds on which the fiber still remains, and germinate, in about thirty-one hours after being planted, at a temperature of 85° Fahrenheit.

In an application filed by me in the United States Patent Office on the 2d day of June, 1883, and of which this is a division, I have claimed, broadly, the treatment of cotton-seed by subjecting it to the action of a solution of sulphuric acid of commerce and water, in the proportions of about one part, by measure, of acid and about two to six parts, by measure, of water. I therefore lay no claim to such treatment, broadly, herein; but What I do claim herein is—

1. A process of treating cotton-seed, consisting in subjecting the seed to the action of a solution of sulphuric acid of commerce and water, in the proportions of about one part, by measure, of the acid and from two parts to six parts, by measure, of water, and then to a mechanical rubbing action to remove the fiber from the seed, substantially as described.

2. A process of treating cotton-seed, consisting in subjecting the seed to the action of a solution of sulphuric acid and water, in about the proportions named, then to an alkaline bath, then to a bath of water, and finally to a mechanical rubbing or abrading action to remove the fiber, substantially as described.

THOMAS TAYLOR.

Witnesses:
WILLIAM FITCH,
EDGAR T. GADDIS.